United States Patent
Bae et al.

(10) Patent No.: US 9,396,315 B2
(45) Date of Patent: Jul. 19, 2016

(54) METHOD OF PERFORMING IMAGE FORMING OPERATION USING USER INFORMATION AND IMAGE FORMING APPARATUS FOR PERFORMING THE METHOD

(75) Inventors: Sung-hoon Bae, Hwaseong-si (KR); Hyeong-bae Yu, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 82 days.

(21) Appl. No.: 13/602,754

(22) Filed: Sep. 4, 2012

(65) Prior Publication Data

US 2013/0155444 A1    Jun. 20, 2013

(30) Foreign Application Priority Data

Dec. 20, 2011  (KR) .................. 10-2011-0138488

(51) Int. Cl.

| G06F 15/00 | (2006.01) |
|---|---|
| G06F 21/31 | (2013.01) |
| H04L 29/06 | (2006.01) |
| H04L 29/08 | (2006.01) |
| G06F 3/12 | (2006.01) |
| H04L 12/58 | (2006.01) |
| H04L 29/12 | (2006.01) |

(52) U.S. Cl.
CPC ............ G06F 21/31 (2013.01); H04L 63/0892 (2013.01); H04L 67/306 (2013.01); *G06F 2221/2145* (2013.01); *H04L 12/584* (2013.01); *H04L 61/1523* (2013.01)

(58) Field of Classification Search
CPC ....... G06F 21/608; G06F 21/31; G06F 21/33; G06F 21/84; G06F 21/629; G06F 3/1222; G06F 2221/2115; H04N 1/4415; H04N 1/00856
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| 2003/0120624 A1* | 6/2003 | Poppenga et al. ................ 707/1 |
| 2004/0130743 A1* | 7/2004 | Nozato ........................ 358/1.14 |
| 2006/0099947 A1* | 5/2006 | Shozaki et al. ............ 455/435.1 |
| 2009/0064289 A1* | 3/2009 | Jang ................................. 726/4 |

(Continued)

FOREIGN PATENT DOCUMENTS

| EP | 2336934 A2 | 6/2011 |
| EP | 2336934 A3 | 4/2012 |

OTHER PUBLICATIONS

Extended European Search Report dated Jun. 5, 2014 in corresponding European Application No. 12181475.

*Primary Examiner* — Thierry L Pham
(74) *Attorney, Agent, or Firm* — Staas & Halsey LLP

(57) ABSTRACT

A method of performing an image forming operation using user information, the method including receiving domain information of a user and performing user authentication using the received domain information; receiving a request for the image forming operation after successfully performing the user authentication; querying a lightweight directory access protocol (LDAP) server using the domain information used for the user authentication to acquire user information necessary for performing the image forming operation; and performing the image forming operation using the user information acquired by querying the LDAP server.

6 Claims, 9 Drawing Sheets

(56) References Cited

U.S. PATENT DOCUMENTS

| | | | |
|---|---|---|---|
| 2009/0070864 A1* | 3/2009 | Nishida | 726/7 |
| 2009/0119755 A1* | 5/2009 | Kodimer et al. | 726/4 |
| 2009/0193451 A1* | 7/2009 | O'Neil | 725/29 |
| 2010/0302575 A1* | 12/2010 | Hanaoka | G06F 3/1222 358/1.15 |
| 2011/0258697 A1* | 10/2011 | Ikeda | 726/16 |
| 2011/0261386 A1* | 10/2011 | Kasuya | 358/1.14 |
| 2011/0265144 A1* | 10/2011 | Ikeda et al. | 726/3 |
| 2011/0271324 A1* | 11/2011 | Ikeda | 726/3 |
| 2012/0215688 A1* | 8/2012 | Musser et al. | 705/40 |
| 2012/0229851 A1* | 9/2012 | Nishida | 358/1.15 |
| 2012/0327465 A1* | 12/2012 | Yamada | 358/1.15 |

* cited by examiner

FIG. 4

```
> User Authentication > Network Authentication >>
> General
Authentication Type:    ○ Kerberos (Unix, Linux)    412
                        ◉ Kerberos (Windows ADS)            410
                        ○ SMB (Windows NT 4)
                        ○ SMB (Windows ADS)
                        ○ LDAP > Required information                    422
Default Realm:          org1
IP Address or Host Name:  ◉ IP Address  — 424        420
                        ○ Host Name   426    428
Kerberos Server and Post  10.88.10.10  :  88

> Additional information                  432
Backup Realm:           org2
IP Address or Host Name:  ◉ IP Address  — 434        430
                        ○ Host Name   436    438
Kerberos Backup Server and Post  10.88.10.11  :  88
                        Alternates....

442 — Apply    Undo — 444
```

FIG. 5

```
LDAP Server
    LDAP Server:            10.88.197.215
    Port Number:            389              (1~65535)                    510
    Match User's Login ID to the    CN  ▼
    following LDAP attribute:

Secure LDAP Connection
    Secure LDAP via SSL:    ☐ Enable

LDAP User Search
    Search Root Directory:  OU=BulkUsers,...
    Authentication Methods:  ○ Anonymous
                             ⦿ Simple Login ID:               bulk
    Password:
    Confirm Password:
                            ☐ Change password
    Append Root to Base DN: ☐ Enable Append Network Authentication    Off           ▼ — 522
Domain to Search Root Directory  Off
                         524 {   From only                                520
                                 To/cc/bcc only
                                 All
```

METHOD OF PERFORMING IMAGE FORMING OPERATION USING USER INFORMATION AND IMAGE FORMING APPARATUS FOR PERFORMING THE METHOD

CROSS-REFERENCE TO RELATED APPLICATIONS

This application claims the benefit of Korean Patent Application No. 10-2011-0138488, filed on Dec. 20, 2011, in the Korean Intellectual Property Office, the disclosure of which is incorporated herein in its entirety by reference.

BACKGROUND

1. Field

The present disclosure relates to a method of acquiring user information by querying a lightweight directory access protocol (LDAP) server during an image forming operation that uses the user information.

2. Description of the Related Art

An image forming apparatus such as a printer, a facsimile, a scanner, or a multi-functional machine may need user information in order to perform an image forming operation. For example, the image forming apparatus may need an email address of a user, which is used to transmit a scanned image, as an outgoing address in order to perform a scan to email function.

User information such as an email address is acquired by querying a lightweight directory access protocol (LDAP) server. An LDAP is a software protocol that aids in finding positions of organizations, individuals, or resources, such as files or devices, which are provided on a network, such as the Internet or an enterprise's intranet.

Meanwhile, if an image forming operation is performed using wrong user information, confusion may arise. For example, if a scan to email function is performed using a wrong email address as an outgoing address, although a receiver sends a reply to a sender via email, the reply may not be received by the sender. Therefore, it is very important to acquire accurate user information by querying the LDAP server.

SUMMARY

The present disclosure provides a method of performing an image forming operation using user information acquired by querying a lightweight directory access protocol (LDAP) server.

According to an aspect of the present disclosure, there is provided a method of performing an image forming operation using user information, the method including: receiving domain information of a user and performing user authentication using the received domain information; receiving a request for the image forming operation after successfully performing the user authentication; querying a lightweight directory access protocol (LDAP) server using the domain information used for the user authentication to acquire user information necessary for performing the image forming operation; and performing the image forming operation using the user information acquired by querying the LDAP server.

The querying may include: generating query data to include the domain information, transmitting the query data to the LDAP server, and acquiring the user information from the LDAP server.

The querying may include: transmitting query data generated not to include the domain information to the LDAP server, acquiring the user information from the LDAP server, and selecting information corresponding to the domain information from the acquired user information.

The domain information of the user may be domain information of an organization to which the user belongs.

The method may further include: before the querying, setting whether or not the domain information is to be used when the LDAP server is queried, wherein the setting includes: querying the LADP server when it is set that the domain information is to be used when the LDAP server is queried.

The image forming operation may be an operation of transmitting a scanned image via email, wherein the performing of the image forming operation includes: forming the scanned image; and transmitting the scanned image via email by using an email address of the user, which is acquired by querying the LDAP server, as a sender address.

According to another aspect of the present disclosure, there is provided a non-transitory computer-readable recording medium having embodied thereon a computer program for executing the method of performing an image forming operation using user information.

According to another aspect of the present disclosure, there is provided an image forming apparatus including: a local panel unit to receive domain information used for user authentication and a request for an image forming operation; a Web user interface (UI) unit to set an external authentication server used for the user authentication and an external LDAP server to acquire user information; a communication unit to perform the user authentication by communicating with the authentication server and acquiring the user information by querying the external LDAP server; a control unit to allow the communication unit to query the external LDAP server by using the domain information used for user authentication; and an image processing unit to perform the image forming operation by using the acquired user information.

The control unit may control the communication unit to generate query data to include the domain information and transmit the query data to the LDAP server, wherein the communication unit acquires the user information from the LDAP server.

The control unit may control the communication unit to transmit query data generated to not include the domain information to the LDAP server, acquire the user information from the LDAP server, and select information corresponding to the domain information from the acquired user information.

The Web UI unit may include: a domain setting unit to set whether or not the domain information is to be used when the LDAP server is queried, wherein the control unit includes: a domain control unit to transfer the setting of the domain setting unit to the communication unit, wherein the communication unit includes: a domain processing unit to generate query data to include the domain information according to the setting received from the domain control unit.

The image forming operation may be an operation of transmitting a scanned image via email, wherein the image processing unit forms the scanned image of a document requested by the user, wherein the communication unit transmits the scanned image via email by using an email address of the user, which is acquired by querying the LDAP server, as a sender address.

Additional aspects and/or advantages will be set forth in part in the description which follows and, in part, will be apparent from the description, or may be learned by practice of the disclosure.

BRIEF DESCRIPTION OF THE DRAWINGS

The above and other features and advantages of the present disclosure will become more apparent by describing in detail exemplary embodiments thereof with reference to the attached drawings in which:

FIG. 4 illustrates a screen for setting an authentication server;

FIG. 5 illustrates a screen for setting an LDAP server;

DETAILED DESCRIPTION

The present disclosure will now be described more fully with reference to the accompanying drawings, in which exemplary embodiments of the present disclosure are shown. The detailed descriptions regarding functions or configurations widely known to one of ordinary skill in the art to which the embodiments below pertain may be omitted so as not to diminish the clarity of the features of the embodiments.

A case where an image forming apparatus executes an application program such as a scan to email function is described in the present embodiment. Scan to email is an application program that scans an image and transfers the scanned image via email in the image forming apparatus. However, this is merely exemplary and the present disclosure is not limited thereto. Other application programs using user information such as an email address of a user or a telephone number of the user, etc. may also apply to the present embodiment.

In the present embodiment, the image forming apparatus can execute the application program only after successfully performing user authentication. Although, in the present embodiment, the image forming apparatus can execute the application program only when acquiring necessary user information from a lightweight directory access protocol (LDAP) server, different types of protocols and servers can also be used to acquire the user information.

Figure 1:
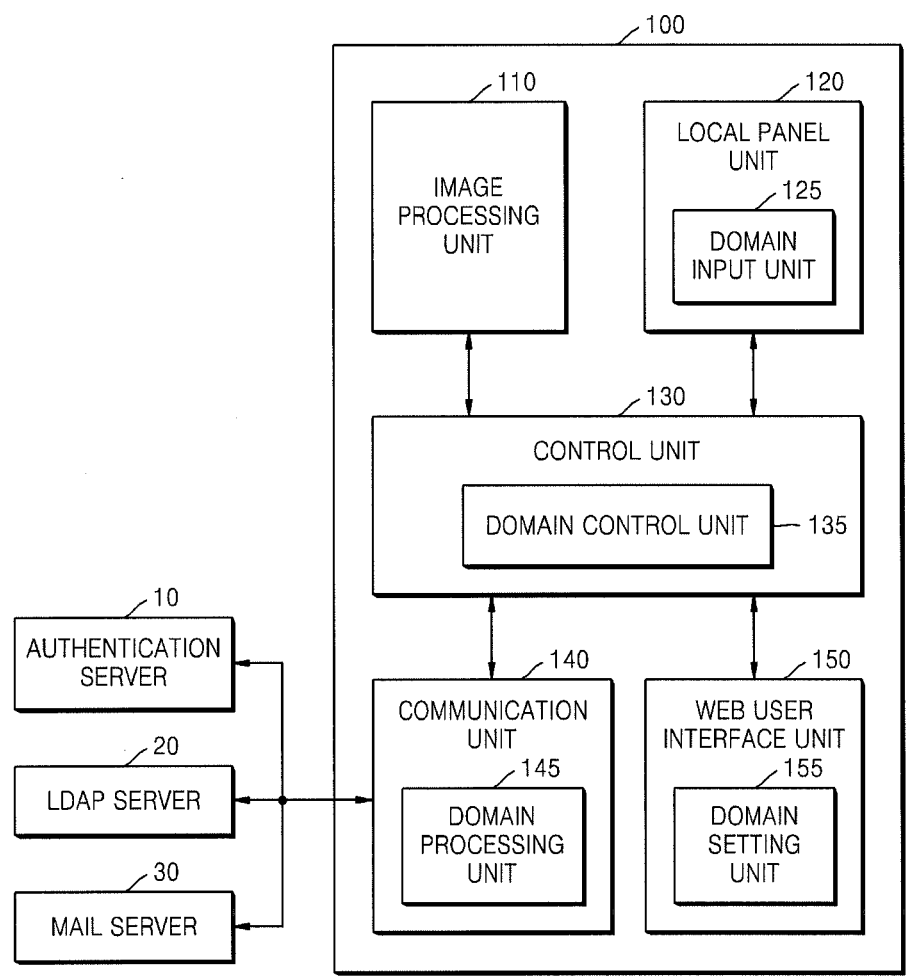
FIG. 1 is a block diagram of an image forming apparatus, an authentication server, a lightweight directory access protocol (LDAP) server, and a mail server that are connected to the image forming apparatus according to an embodiment of the present disclosure.

FIG. 1 is a block diagram of an image forming apparatus 100, an authentication server 10, a lightweight directory access protocol (LDAP) server 20, and a mail server 30 that are connected to the image forming apparatus 100 according to an embodiment of the present disclosure. Referring to FIG. 1, the image forming apparatus 100 of the present embodiment may include an image processing unit 110, a local panel unit 120, a control unit 130, a communication unit 140, and a Web user interface (UI) unit 150. The local panel unit 120 may include a domain input unit 125. The control unit 130 may include a domain control unit 135. The communication unit 140 may include a domain processing unit 145. The Web UI unit 150 may include a domain setting unit 155.

Figure 2:
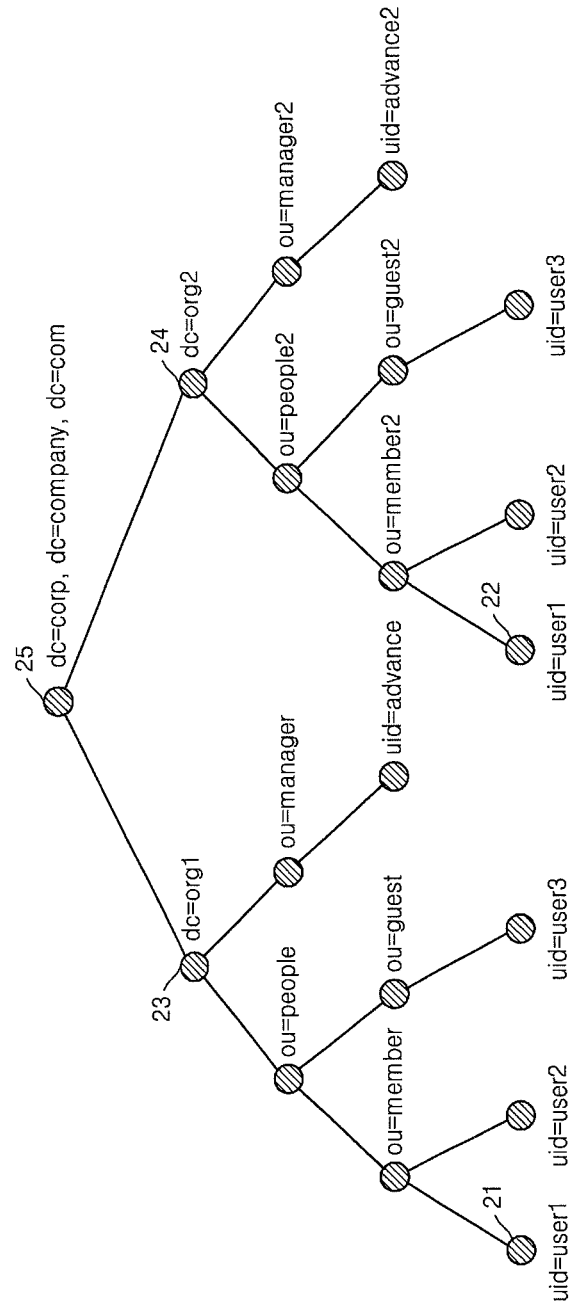
FIG. 2 illustrates an LDAP directory.
Figure 3:
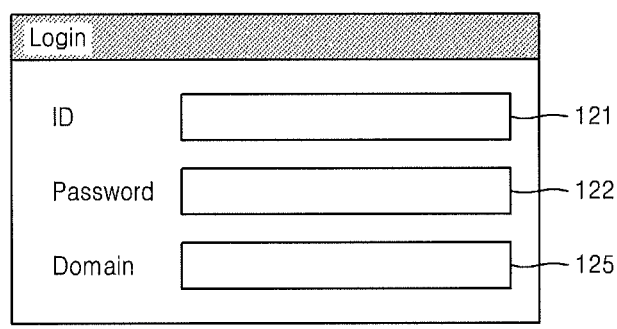
FIG. 3 illustrates a screen of a local panel unit during user authentication.

The local panel unit 120 of the image forming apparatus 100 receives a user ID, a password, and domain information from a user so as to authenticate the user. In this regard, the domain information is received through the domain input unit 125. If the local panel unit 120 receives the user ID, the password, and the domain information, the control unit 130 transfers the user ID, the password, and the domain information to the communication unit 140. The communication unit 140 authenticates the user by transmitting the user ID, the password, and the domain information to the authentication server 10. In this regard, the domain information of the user means domain information regarding a group or an organization to which the user belongs. Referring to FIG. 2 that illustrates an LDAP directory, two users 21 and 22 use the same user ID user1 but belong to different groups or organizations, and thus the users 21 and 22 have different domain information. The user 21 has domain information org1, and the user 22 has domain information org2. FIG. 3 illustrates a screen of the local panel unit 120 that is used during user authentication. The screen includes a user ID input unit 121, a password input unit 122, and a domain input unit 125.

A method of setting the authentication server 10 used to authenticate a user will now be described in detail with reference to FIG. 4.

FIG. 4 illustrates a screen for setting the authentication server 10. The following is a process of setting the authentication server 10 with reference to FIG. 4. Any one of a Kerberos server, a server message block (SMB) server, and an LDAP server may be selected as a type of the authentication server 10. A Windows based Kerberos server 412 in 410 of the screen is selected as the authentication server 10. Therefore, an image forming apparatus authenticates a user through the selected Windows based Kerberos server 412.

Domain information is needed to authenticate the user. In the Windows based Kerberos server 412, realm information corresponds to the domain information. Parts 420 and 430 of the screen show examples of setting a default value and a backup value of the domain information. In 420, "org1" is input as a default domain in 422, an IP address is input from among an IP address and a host name of the Kerberos server in 424, the IP address is input in 426, and a port number is input in 428, and thus the default value of the domain information is set. Meanwhile, in 430, "org2" is input as a backup domain of the domain information in 432, an IP address is input from among an IP address and a host name of the Kerberos server in 434, the IP address is input in 436, and a port number is input in 438, and thus the backup value of the domain information is set. If settings are exactly input, "apply" is selected in 442 and thus the process of setting the authentication server 10 is complete. If there is a correction, "undo" is selected in 444 and thus the process may be newly performed.

If the process of setting the authentication server 10 is complete as shown in FIG. 4, a default domain "org1" is basically input in the domain input unit 125 of the screen of the local panel unit 120 of FIG. 3. If the user touches the domain input unit 125, the screen may show a list of backup domains "org2". That is, the user may input a user ID and password of the user and select "org1" or "org2" as the domain information of the user during the user authentication.

Figure 6:
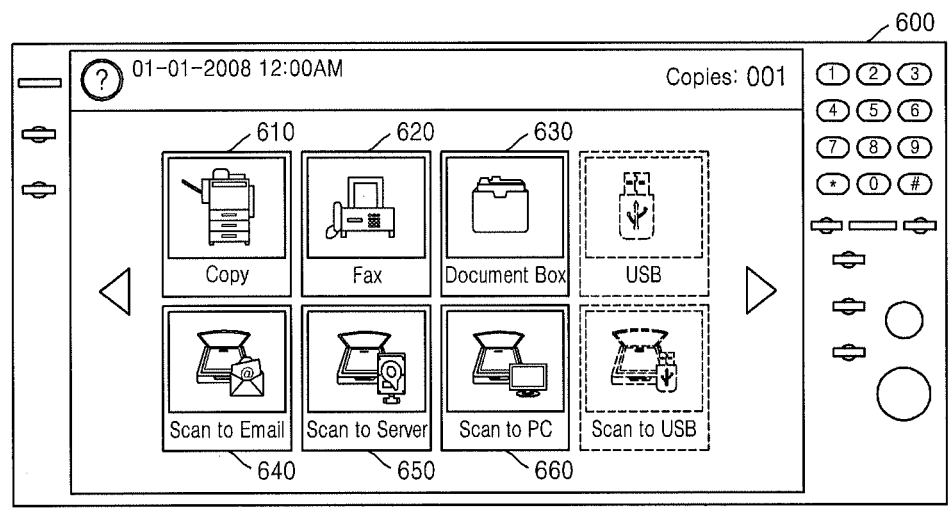
FIG. 6 illustrates a screen for selecting an application program.

If the user authentication is successful, the local panel unit 120 displays a screen 600 for selecting an application program to the user as shown in FIG. 6. Referring to FIG. 6, a user may select and execute any one application program of copy 610, fax 620, document box 630, scan to email 640, scan to server 650, and scan to PC 660. In the present embodiment, the user executes the scan to email 640 as described above.

If the user is requested to execute the scan to email 640, the image processing unit 110 scans a document and transfers the scanned image to the control unit 130. The control unit 130 transfers the scanned image to the communication unit 140. The communication unit 140 needs an email address of the user as an outgoing address in order to transmit the scanned image to the mail server 30 according to the execution of the scan to email 640. Thus, if a scan to email command is received from the user, the local panel unit 120 requests the email address of the user from the control unit 130. Although the email address of the user is requested in the present embodiment, user information such as a telephone number, a fax number, etc. may be requested as occasion demands. The LDAP server 20 stores the user information and email addresses therein, and thus the user information may be acquired by querying the LDAP server 20.

If the control unit 130 receives a request for the email address of the user from the local panel unit 120, the control unit 130 transfers information (the user ID and the domain information) received during the user authentication and setting information of the LDAP server 20 to the communication unit 140. In this regard, a method of setting the LDAP server 20 will now be described in detail with reference to FIG. 5.

FIG. 5 illustrates a screen for setting the LDAP server 20. Referring to FIG. 5, in 510 of the screen, an IP address and a port number of the LDAP server 20 are input, and an LDAP attribute to be matched to a user's login ID during querying is set. In FIG. 5, the LDAP attribute to be matched to the user's login ID is set as common name (CN). This means that if a user ID is used to query, user information having a CN value identical to the user ID as an attribute is a query result. In 520 of the screen, settings regarding whether or not the domain information received during the user authentication is used to query may be made, and, if the domain information is used, settings regarding user information acquired by using the domain information may be made. A current setting value is input in 522 of the screen. When a user selects 522, a list of other available setting values may be displayed like 524. "From only" means that domain information is used only when the LDAP server 20 is queried to acquire an email address of a sender. "To/cc/bcc only" means that domain information is used only when the LDAP server 20 is queried to acquire email addresses of a receiver, a carbon copy (CC) receiver, and a blind CC receiver. "All" and "off" mean that domain information is used and is not used in all cases, respectively.

The communication unit 140 is connected to the LDAP server 20, generates query data using information (the user ID and the domain information) received during the user authentication and setting information of the LDAP server 20, and sends the query data to the LDAP server 20 to query the LDAP server 20. The query data generated using the user ID and the domain information is as follows.

"CN=user1, DC=org2, DC=corp, DC=company, DC=com"

If the LDAP server 20 having the LDAP directory of FIG. 2 is queried using the query data, the email address of the user 22 of FIG. 2 may be acquired as a query result. The query data includes the domain information "DC=org2" input during the user authentication, thereby acquiring an accurate email address of the user 22 between the two users 21 and 22 having the user ID user1. Since no domain information is used to conventionally query an LDAP server, a user is not identified from among two users having user IDs and the same email address, which lowers accuracy, whereas the present disclosure uses the domain information input during the user authentication to query the LDAP server 20, which solves this conventional problem.

Figure 7:
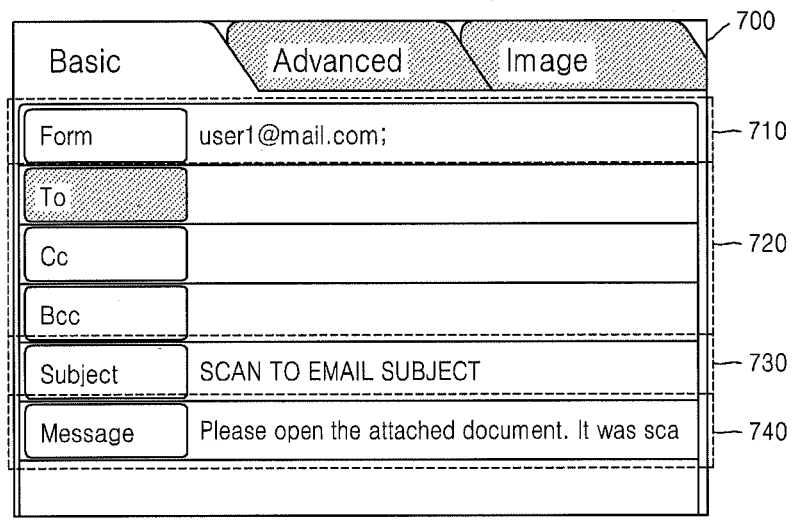
FIG. 7 illustrates a screen for setting scan to email.

The communication unit 140 may query the LDAP server 20 and transfer the email address of the user acquired from the LDAP server 20 to the control unit 130 to allow the email address of the user to be displayed on a scan to email setting screen of the local panel unit 120 while using the email address of the user as an address of a sender when executing scan to email. FIG. 7 illustrates a screen 700 for setting scan to email displayed on the local panel unit 120. The local panel unit 120 displays the screen of FIG. 7 if a user inputs a scan to email command, the LDAP server 20 is queried, and an email address of the user is received. Referring to FIG. 7, the email address of the user acquired by querying the LADP server 20 is input in 710 of the screen. A title and a message of an email that transmits a scanned image are input in 730 and 740 of the screen, respectively. The user may input the email address to which the scanned image is to be transmitted in 720 of the screen.

The Web UI unit 150 sets the authentication server 10 and the LDAP server 20 as described above. In particular, the domain setting unit 155 of the Web UI unit 150 sets whether to use domain information to query the LDAP server 20. If the domain setting unit 155 sets that the domain information is to be used to query the LADP server 20, the domain control unit 135 transfers the setting to the domain processing unit 145. The domain processing unit 145 receives the setting and allows query data generated by the communication unit 140 to include the domain information.

Meanwhile, although the domain information of the user, which is used to authenticate the user, is used to query in order to acquire the email address of the user from the LDAP server 20 in the present embodiment, an email address corresponding to the domain information of the user, which is used to authenticate the user, may be selected from email addresses acquired by querying the LDAP server 20 without using the domain information.

Figure 8:
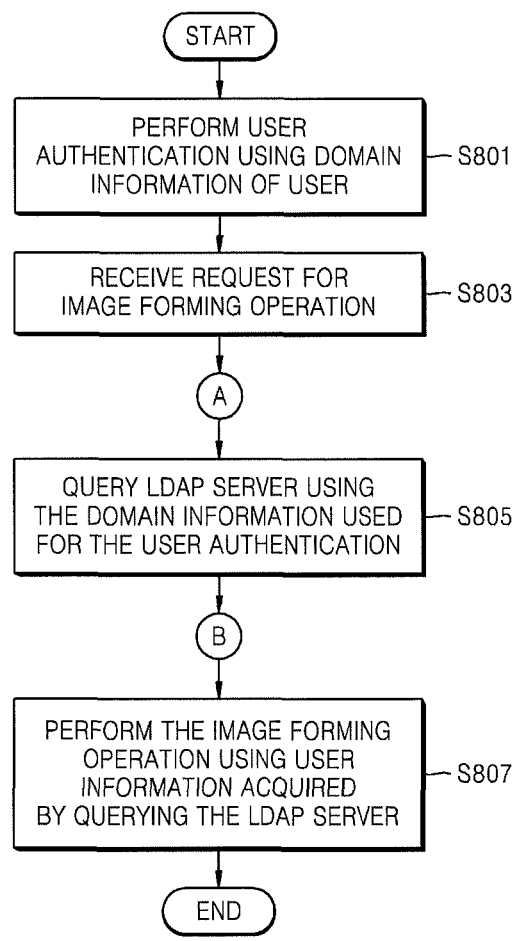
FIGS. 8 through 10 are flowcharts of a method of performing an image forming operation using user information according to an embodiment of the present disclosure.
Figure 9:
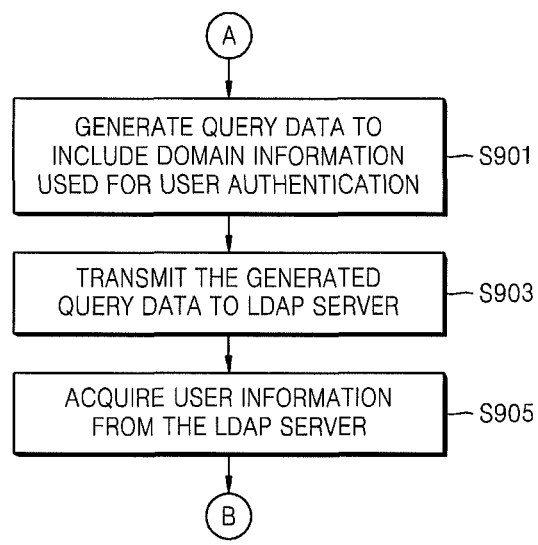
Figure 10:
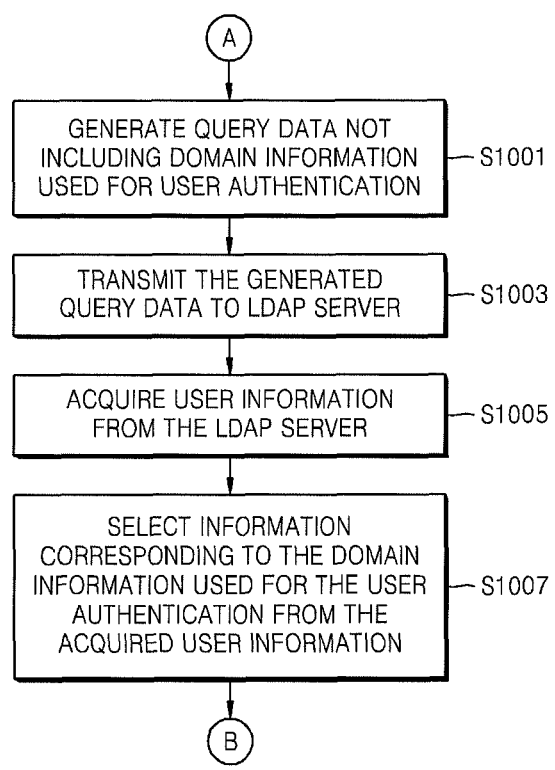

FIGS. 8 through 10 are flowcharts of a method of performing an image forming operation using user information according to an embodiment of the present disclosure.

Referring to FIG. 8, in operation S801, an image forming apparatus performs user authentication using user information. User authentication is necessarily required to perform the image forming operation in order to prevent the image forming operation from being performed by an unauthorized user request. User authentication may be performed by using one of an SMB server and an LDAP server. Furthermore, since domain information of a user is necessary for the user authentication, the image forming apparatus performs the user authentication by receiving a user ID, a password, and domain information from the user. In this regard, the domain information of the user is domain information of an organization to which the user belongs.

If the image forming apparatus successfully performs the user authentication, in operation 803, the image forming apparatus receives a request for the image forming operation. In the present embodiment, in particular, the image forming apparatus receives a scan to email request from the user. The image forming apparatus that receives the request scans a document provided from the user, generates a scanned image, and prepares to send the generated scanned image to an email address designated by the user as a receiving address.

An email address of a sender, i.e. an email address of the user, is necessary for sending the scanned image via email. Thus, in operation S805, the image forming apparatus queries the LDAP server by using the domain information used for the user authentication, thereby acquiring an accurate email address of the user.

If the image forming apparatus acquires the user information as a result of querying the LDAP server in operation S805, in operation S807, the image forming apparatus performs the image forming operation using the acquired user information. For example, in scan to email, the image forming apparatus sends the scanned image to an email address desired by the user by using the email address of the user, which was acquired by querying the LDAP server in operation S805, as a sender address.

FIGS. 9 and 10 are detailed flowcharts of operation S805 of FIG. 8 according to embodiments of the present disclosure.

Referring to FIG. 9, in operation S901, query data is generated to include the domain information used for the user authentication. For example, if the domain information used for the user authentication is "org2" and a user ID is "user1", the query data "CN=user1, DC=org2, DC=corp, DC=company, DC=com" is generated. If the query data is generated, in operation S903, the query data is transmitted to the LDAP server. In operation S905, the user information is acquired from the LDAP server.

Meanwhile, in the embodiment described with reference to FIG. 10, although domain information is not included in query data, information corresponding to the domain information is selected from user information acquired by querying an LDAP server. More specifically, referring to FIG. 10, in operation S1001, query data is generated to not include the domain information used for the user authentication. That is, the query data "CN=user1, DC=org2, DC=corp, DC=company, DC=com" is generated. If the query data is generated, in operation S1003, the query data is transmitted to the LDAP server. In operation S1005, the user information is acquired from the LDAP server. In operation S1007, information corresponding to the domain information used for the user authentication is selected from the acquired user information.

As described above, when an image forming operation is performed by using user information, a LDAP server is queried by using domain information used for user authentication, thereby acquiring accurate user information.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method of performing an image forming operation using user information, the method comprising:
receiving domain information of a user and performing user authentication using the received domain information;
receiving a request for the image forming operation after successfully performing the user authentication;
querying a lightweight directory access protocol (LDAP) server using the domain information used for the user authentication to acquire an email address necessary for performing the image forming operation;
performing the image forming operation; and
sending a result of the image forming operation to the email address acquired by querying the LDAP server,
wherein the domain information of the user is information of an organization to which the user belongs,
wherein the image forming operation is an operation of transmitting a scanned imaqe via the email address, and
wherein the performing of the image forming operation further comprises:
forming the scanned image; and
transmitting the scanned image via email by using the email address of the user,
which is acquired by querying the LDAP server, as a sender address.

2. The method of claim 1, wherein the querying of the LDAP server comprises: generating query data to include the domain information, transmitting the query data to the LDAP server, and acquiring the email address from the LDAP server.

3. The method of claim 1, wherein the querying of the LDAP server comprises: transmitting query data generated not to include the domain information to the LDAP server, acquiring the email address from the LDAP server, and selecting information corresponding to the domain information from the acquired email address.

4. The method of claim 1, further comprising: before the querying, setting whether or not the domain information is to be used when the LDAP server is queried,
wherein the setting comprises: querying the LADP server when it is set that the domain information is to be used when the LDAP server is queried.

5. A non-transitory computer-readable recording medium having embodied thereon a computer program for executing the method of claim 1.

6. The method of claim 1,
wherein the querying of the LDAP server includes using a user identification (ID) and the domain information to acquire the email address, and
wherein the domain information is entered and stored as a default domain which is used with a plurality of different user IDs.

* * * * *